(12) United States Patent
Tanno et al.

(10) Patent No.: US 7,387,141 B2
(45) Date of Patent: Jun. 17, 2008

(54) LOW NOISE PNEUMATIC TIRE

(75) Inventors: Atsushi Tanno, Hiratsuka (JP); Toshiyuki Ikeda, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 90 days.

(21) Appl. No.: 10/563,297

(22) PCT Filed: Aug. 3, 2004

(86) PCT No.: PCT/JP2004/011072

§ 371 (c)(1),
(2), (4) Date: Jan. 3, 2006

(87) PCT Pub. No.: WO2005/012005

PCT Pub. Date: Feb. 10, 2005

(65) Prior Publication Data

US 2006/0157180 A1 Jul. 20, 2006

(30) Foreign Application Priority Data

Aug. 4, 2003 (JP) ............... 2003-285815
Aug. 4, 2003 (JP) ............... 2003-285829

(51) Int. Cl.
*B60C 5/00* (2006.01)
*B60C 19/00* (2006.01)
(52) U.S. Cl. .............. 152/155; 152/157; 152/158; 152/196

(58) Field of Classification Search ........... 152/155, 152/157, 158, 196
See application file for complete search history.

(56) References Cited

FOREIGN PATENT DOCUMENTS

| EP | 1253025 | * 10/2002 |
|---|---|---|
| JP | 62-216803 | 9/1987 |
| JP | 09-086113 | 3/1997 |
| JP | 2000-062408 | 2/2000 |
| JP | 2003-048407 | 2/2003 |
| JP | 2003-226104 A | 8/2003 |
| JP | 2004-291855 | 10/2004 |

OTHER PUBLICATIONS

International Search Report, Nov. 9, 2004.

* cited by examiner

*Primary Examiner*—Justin Fischer
(74) *Attorney, Agent, or Firm*—Greer, Burns & Crain, Ltd.

(57) ABSTRACT

This invention provides a low noise pneumatic tire allowed to achieve an efficient noise reduction effect by making full use of characteristics of a sound absorbing material. A pneumatic tire according to the present invention is a low noise pneumatic tire where a band-shaped sound absorbing material formed of a porous material whose apparent density defined in JIS K6400 is in a range of 10 to 70 kg/m³, is attached on the inner surface of a tread by use of an elastic fixing band.

19 Claims, 8 Drawing Sheets

Inner surface of the tire

Inner surface of the tire

LOW NOISE PNEUMATIC TIRE

TECHNICAL FIELD

The present invention relates to a low noise pneumatic tire, and more specifically, relates to a low noise pneumatic tire allowed to effectively reduce noise caused by cavity resonance.

BACKGROUND ART

One of the causes of tire noise is cavity resonance sound caused by vibration of air filled in the inside of a tire. When the tire is rotated under a load, a ground-contacting portion in a tread portion of the tire vibrates because of irregularities on a ground surface and this vibration causes vibration of the air inside the tire and generates the cavity resonance sound. This cavity resonance sound is generated by vibration of air inside the tire caused by vibration of a ground-contacting portion in a tread portion of the tire which is generated by irregularities on a ground surface when the tire is rotated under a load. In this cavity resonance sound, it has been known that frequencies perceived as noise are approximately 200 to 250 Hz although they differ by tire size. Therefore, for the purpose of reducing tire noise, it is important to reduce noise level in a range of the above frequencies.

As a method of reducing noise caused by the cavity resonance phenomenon as above, there has been a proposed approach where a sound-absorbing material is added to the inside of a tire to absorb resonance (refer to Patent Document 1, for example). However, a full consideration has not been given to characteristics of the sound-absorbing material in this approach, and it is not necessarily considered that the approach has achieved an excellent result in noise reduction.
[Patent Document 1] Japanese patent application Kokai publication No. Sho62-216803

DISCLOSURE OF THE INVENTION

An object of the present invention is to provide a low noise pneumatic tire allowed to achieve an efficient noise reduction effect by making full use of characteristics of a sound absorbing material.

A pneumatic tire according to the present invention for achieving the above object is formed of any one of the following (1) to (11):

(1) A low noise pneumatic tire, where a band-shaped sound absorbing material formed of a porous material whose apparent density defined in JIS K6400 is in a range of 10 to 70 kg/m$^3$, is attached to the inner surface of a tread by use of an elastic fixing band;

(2) The low noise pneumatic tire according to (1), where the band-shaped sound absorbing material is fixed all around the entire circumference on the inner surface of the tread by use of an elastic fixing band;

(3) The low noise pneumatic tire according to any one of (1) and (2), where an irregular surface having step heights equal to or less than 20 mm is formed on the inner peripheral surface of the band-shaped sound absorbing material;

(4) The low noise pneumatic tire according to any one of (1) to (3), where a second porous material whose sound absorption coefficient defined in JIS A1405 at a frequency of 200 Hz is at least 10%, is layered on a cavity-facing surface of the band-shaped sound absorbing material;

(5) The low noise pneumatic tire according to (4), where the band-shaped sound absorbing material has a thickness in a range of 5 to 45 mm, and the second porous material has a flat surface and has a thickness in a range of 5 to 45 mm;

(6) The low noise pneumatic tire according to (4), where irregularities having step heights equal to or less than 20 mm are formed on a surface of the second porous material;

(7) The low noise pneumatic tire according to (6), where the band-shaped sound absorbing material has a thickness in a range of 5 to 45 mm, and the second porous material has a thickness in a range of 5 to 45 mm;

(8) The low noise pneumatic tire according to any one of (1) to (3), where a porous material whose sound absorption coefficient defined in JIS A1405 at a frequency of 200 Hz is at least 10%, is layered on both inner and outer surfaces of the band-shaped sound absorbing material;

(9) The low noise pneumatic tire according to any one of (1) to (8), where the elastic fixing band has a stretching mechanism, which automatically adjusts a circumferential length of the elastic fixing band, in at least one location on the circumference of the elastic fixing band;

(10) The low noise pneumatic tire according to (9), where the stretching mechanism is formed of an elastic spring mechanism; and

(11) The low noise pneumatic tire according to (9), where the stretching mechanism is formed by coupling both ends of the elastic fixing band with each other in a manner that the elastic fixing band can slide.

According to a low noise pneumatic tire of the present invention, by forming a band-shaped sound absorbing material from a porous material and appropriately setting the apparent density defined in JIS K6400 for the porous material, and by attaching the porous material all around an entire circumference on an inner surface of a tread of the tire by use of an elastic fixing band, an effect of reducing tire cavity resonance sound is obtained through a sound absorption function realized all around the circumference by the porous material.

EXPLANATION OF NUMERALS AND SYMBOLS

Figure 1:
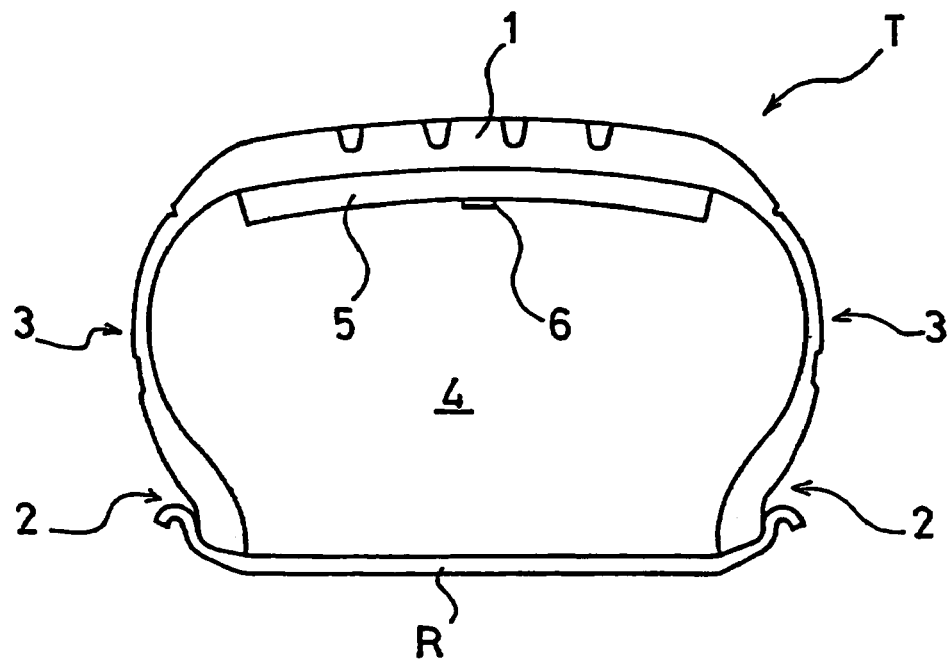
FIG. 1 is a cross-sectional view showing a low noise pneumatic tire according to an embodiment of the present invention, taken along a meridian of the tire, when the tire is assembled with a rim and is inflated with a pneumatic pressure.

1: tread portion
2: bead portion
3: sidewall portion
4: cavity portion
5: band-shaped sound absorbing material
5a: second porous material
6: elastic fixing band
7a, 7b and 7c: plate spring
7: coupling jig
G: ground surface
Q: ground-contacting portion

BEST MODE FOR CARRYING OUT THE INVENTION

Hereinafter, detailed descriptions will be given of configurations of the present invention with reference to the attached drawings. Components common among any plural drawings thereof are attached with the same numerals and symbols, so that duplicated descriptions are omitted.

Figure 2A:
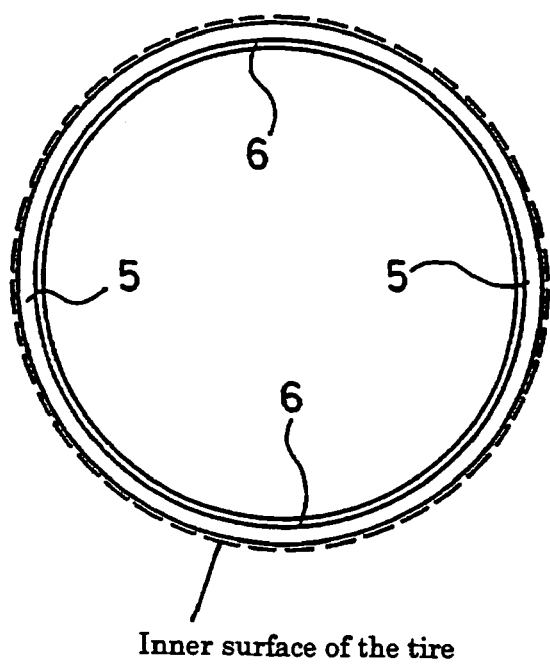
FIG. 2a is a side view for explaining an arrangement relation between a band-shaped sound absorbing material and an elastic fixing band according to the embodiment of the present invention.
Figure 2B:
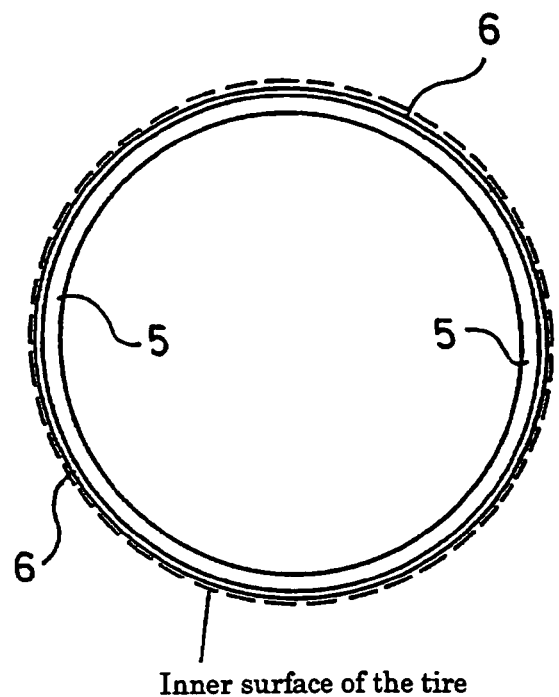
FIG. 2b is another side view for explaining another arrangement relation between the band-shaped sound absorbing material and the elastic fixing band according to the embodiment of the present invention.
Figure 3A:
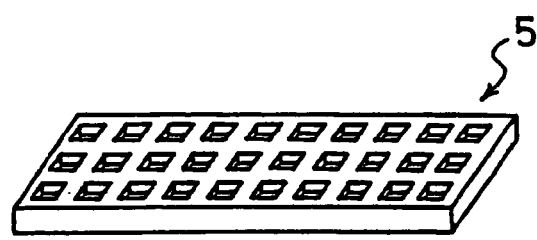
FIG. 3a is a perspective view for explaining a superficial shape of an inner circumferential surface of the band-shaped sound absorbing material according to the embodiment of the present invention.
Figure 3B:
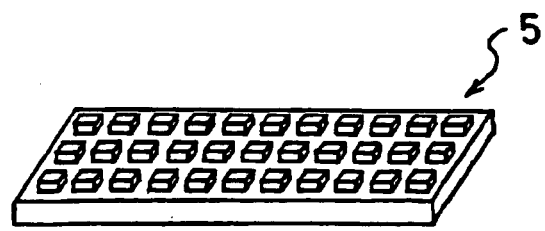
FIG. 3b is a perspective view for explaining a superficial shape of an inner circumferential surface of another band-shaped sound absorbing material according to the embodiment of the present invention.
Figure 3C:
FIG. 3c is a perspective view for explaining a superficial shape of an inner circumferential surface of still another band-shaped sound absorbing material according to the embodiment of the present invention.
Figure 3D:
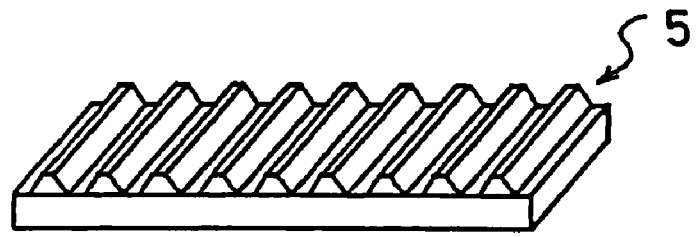
FIG. 3d is a perspective view for explaining a superficial shape of an inner circumferential surface of still another band-shaped sound absorbing material according to the embodiment of the present invention.
Figure 3E:
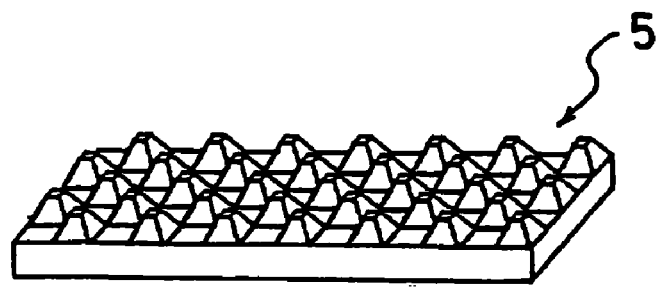
FIG. 3e is a perspective view for explaining a superficial shape of an inner circumferential surface of still another band-shaped sound absorbing material according to the embodiment of the present invention.

FIG. 1 is a cross-sectional view showing one example of a low noise pneumatic tire of the present invention, taken along a meridian of the tire. FIGS. 2a and 2b are side views showing two different examples for explaining the main portion of the tire in FIG. 1. In FIG. 1, a low noise pneumatic tire T includes: a tread portion 1; a pair of left and right bead portions 2; a sidewall portion coupling the tread portion 1 to the bead portions 2. When the tire T is mounted on a rim R, a cavity portion 4 is formed between the tire T and the rim R.

On an inner surface of the tread portion 1, as shown in FIGS. 2a and 2b, a band-shaped sound absorbing material 5 is attached all around an entire circumference of the inner surface of the tread portion by use of an elastic fixing band 6 in a manner that the band-shaped sound absorbing material is attached by pressure to the inner surface of the tread portion 1 by utilizing elasticity of the elastic fixing band. The band-shaped sound absorbing material 5 is formed of a porous material whose apparent density defined in JIS K6400 is in a range from 10 to 70 kg/m$^3$, and the elastic fixing band 6 is formed of a synthetic resin having a high tensile modulus. Note that both ends of the elastic fixing band 6 in a longitudinal direction thereof are coupled with each other in a manner that a circumferential length thereof can be changed.

Although, in FIGS. 2a and 2b, examples where the band-shaped sound absorbing material 5 is attached all around an entire circumference of the inner surface of the tread portion by use of an elastic fixing band 6, the band-shaped sound absorbing material does not always have to be present around the entire circumference thereof. Based on various knowledge of inventors of the present invention, the band-shaped sound absorbing material may be attached around at least 75% of the entire circumferential length of the inner surface of the tread portion, more preferably at least 80% of the entire circumferential length thereof, and most preferably at least 90% of the entire circumferential length thereof. Based on knowledge of the inventors, the case where the band-shaped sound absorbing material is attached all around entire circumference on inner surface of the tread portion is most effective and most preferable.

In FIG. 1, an example where the band-shaped sound absorbing material 5 is attached in a manner that it is attached from the inner circumference by pressure to the inner surface of the tread portion 1 by use of the elastic fixing band 6 is shown. However, a positional relation between the band-shaped sound absorbing material 5 and the elastic fixing band 6 in the tire radial direction may be such that the elastic fixing band 6 is arranged to an outer circumference of the band-shaped sound absorbing material 5. In any one of the above configurations, it is only necessary for the elastic fixing band 6 to attach the band-shaped sound absorbing material 5 to the inner surface of the tread portion 1 by pressure by fixing the band-shaped sound absorbing material 5 by use of a bond or the like and coupling the both ends of the band-shaped sound absorbing material 5 in the lengthwise direction thereof with each other.

Thus, by having an apparent density thereof defined in JIS K6400 to be 70 kg/m$^3$ or less, even while having a porous structure, the band-shaped sound absorbing material 5 can maintain a structure in such a manner that the structure does not suffer compressive deformation due to an inner pressure of the tire. Consequently, a high sound absorption effect can be obtained. However, if the apparent density thereof is lower than 10 kg/m$^3$, a sound absorption performance cannot be obtained because of the excessive size of a porous structure thereof.

Thus, the density of the band-shaped sound absorbing material 5 is set within a specific range, and consequently, while having a porous structure, the band-shaped sound absorbing material 5 does not suffer compressive deformation due to an inner pressure of the tire. Therefore, an excellent sound absorption effect can be obtained. Additionally, the band-shaped sound absorbing material 5 is attached by pressure preferably around at least 75% of the circumferential length of the inner surface of the tire, or more preferably, all around the entire circumference of the inner surface of the tire, by use of elasticity of the elastic fixing band 6 as described above, and hence, is maintained in a stable state where the band-shaped sound absorbing material is hard to separate.

As the porous material forming the band-shaped sound absorbing material 5, resin foam is preferable, and low density polyurethane foam is particularly preferable because it has resistance such that it suffers less compressive deformation due to the inner pressure of the tire. A configuration of bubbles is preferably continuous. Additionally, as the porous material, other than resin foam, non-woven fabric such as felt or mat formed by bonding fibers may be used.

As a material forming the elastic fixing band 6, synthetic resin such as polypropylene resin is preferably used, and in a case where polypropylene resin is used, the polypropylene resin having a flexural modulus in a range of 1100 to 1800 MPa is preferably used. If the flexural modulus thereof is less than 1100 MPa, elasticity thereof is so small that it becomes more difficult for the elastic fixing band 6 to fully exert functions as an elastic band. If the flexural modulus thereof exceeds 1800 MPa, stiffness thereof is so high that the elastic fixing band 6 cannot follow deformation at the time when a tire contacts the ground and thereby become more breakable and durability thereof is reduced. More preferably, the flexural modulus thereof may be set within a range of 1300 to 1700 MPa. Note that the flexural modulus described here is a value obtained by a method of testing a flexural modulus defined in ASTM (American Society for Testing and Material) D790.

In the embodiment shown in FIG. 2a, a case is shown where the band-shaped sound absorbing material 5 is attached on the inner surface of the tread portion 1 in a manner that it is attached thereto by pressure by use of an elastic fixing band 6 placed to the inner surface of the band-shaped sound absorbing material 5. However, with respect to a positional relation in a radial direction of the tire between the elastic fixing band 6 and the band-shaped sound absorbing material 5, the elastic fixing band 6 may be placed to an outer surface of the band-shaped sound absorbing material 5 as shown in FIG. 2b. In both embodiments, it is only necessary for the elastic fixing band 6 to attach the band-shaped sound absorbing material 5 by pressure to the inner surface of the tread portion 1 by fixing the band-shaped sound absorbing material 5 by use of a bond or the like and coupling the both ends of the band-shaped sound absorbing material 5 in the lengthwise direction thereof with each other.

Additionally, on the inner peripheral surface of the band-shaped sound absorbing material 5, it is better to form irregularities in order to enhance a sound absorbing effect. Although the shape of the irregular surface is not particularly limited, any one of shapes shown in FIGS. 3a to 3e is applicable. It is better to set a step height of the irregularities on this irregular surface to 20 mm or less.

Figure 4A:
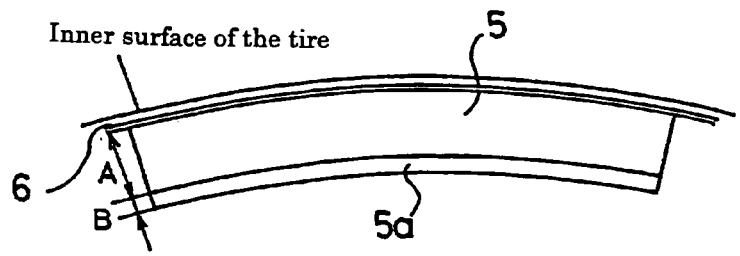
FIG. 4a is a side view for explaining a layered structure of a sound absorbing material according to the embodiment of the present invention.
Figure 4B:
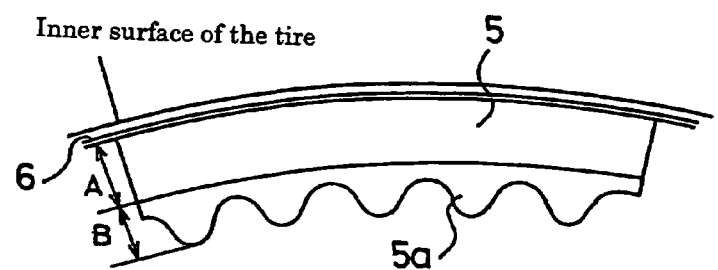
FIG. 4b is a side view for explaining another layered structure of the sound absorbing material according to the embodiment of the present invention.

In the present invention, it is more preferable to layer a second porous material with a different sound absorption characteristic from that of the foregoing porous material, on a surface of the band-shaped sound absorbing material 5 facing the cavity portion 4. In such a case as above where another porous material is layered on one porous material, as shown in FIGS. 4a and 4b as examples, it is preferable that, while the one porous material is arranged facing the inner surface of the tire, the second porous material 5a whose sound absorption coefficient defined in JIS A1405 at a frequency of 200 Hz is at least 10%, is layered on a surface thereof facing the cavity portion 4. By having an apparent density of 10 to 70 kg/m$^3$, the one porous material is excellent enough in resistance to compression not to be crushed by a pneumatic pressure inside the cavity portion 4. Still in this case, it is better to form irregularities on a surface of the second porous material 5a. The second porous material 5a may be resin foam or may be non-woven fabric or the like.

Note that the sound absorption coefficient described in the present invention is a sound absorption coefficient defined in JIS A1405.

In the case as described above where a layered body is formed with the band-shaped sound absorbing material 5 and the second porous material 5a, a thickness A of the band-shaped sound absorbing material 5 is set in a range of 5 to 45 mm. A thickness B of the second porous material 5a is set preferably in a range of 5 to 45 mm, and more preferably in a range of 5 to 10 mm, in a case where the second porous material 5a has a flat surface as shown in FIG. 4a, and is set preferably in a range of 5 to 45 mm, and more preferably in a range of 5 to 20 mm, in a case where the second porous material 5a has an irregular surface as shown in FIG. 4b. Thereby, a crush of the band-shaped sound absorbing material 5 due to the internal pressure of the tire and loss of the sound absorption effect are prevented, and also, a sound absorption performance can be enhanced. It is better to set a thickness of the layered body formed with the band-shaped sound absorbing material 5 and the second porous material 5a to 50 mm or less.

In the case as described above where the second porous material 5a is layered on the surface of the band-shaped sound absorbing material 5, it is better to form a large number of holes S in the second porous material 5a for the purpose of further enhancing the sound absorption effect. The holes S lead to the band-shaped sound absorbing material 5 which is excellent in resistance to compression. Thereby, the holes S perform a role as a passage through which an acoustic energy from the cavity portion 4 of the tire is taken into the band-shaped sound absorbing material 5, and also can prevent a crush of the band-shaped sound absorbing material 5 due to the pneumatic pressure of the tire.

Figure 5A:
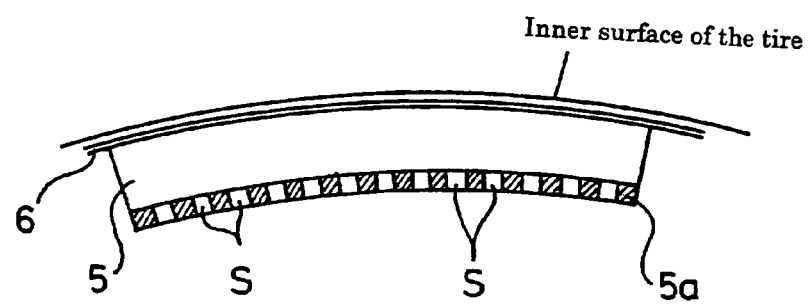
FIG. 5a is a side view for explaining a layered structure of a sound absorbing material according to one other embodiment of the present invention.
Figure 5B:
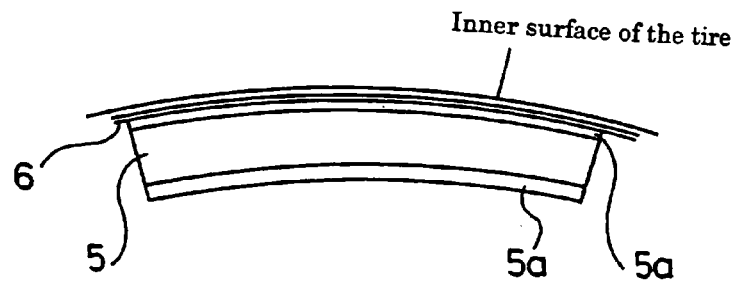
FIG. 5b is a side view for explaining another layered structure of the sound absorbing material according to the one other embodiment of the present invention.

Furthermore, as shown in FIG. 5b, it is also possible to have a structure where both inner and outer surfaces of the band-shaped sound absorbing material 5, which is excellent in resistance to compression, are covered with the second porous material 5a. Thereby, the second porous material 5a is arranged to contact the inner surface of the tire which is a source of cavity resonance, whereby the sound absorption effect is increased from that in the case where the second porous material 5a is arranged only on the inner surface of the band-shaped sound absorbing material 5.

Figure 6A:
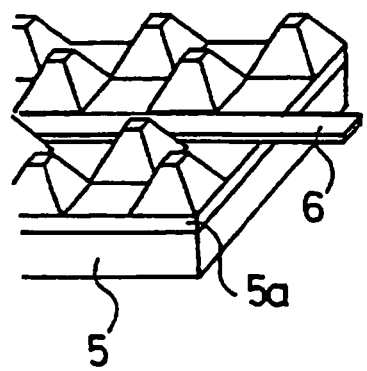
FIG. 6a is a perspective view for explaining an arrangement of the elastic fixing band according to the embodiment of the present invention.
Figure 6B:
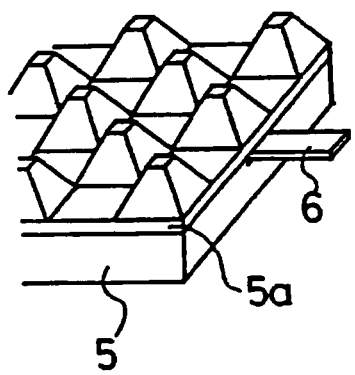
FIG. 6b is a perspective view for explaining another arrangement of the elastic fixing band according to the embodiment of the present invention.
Figure 6C:
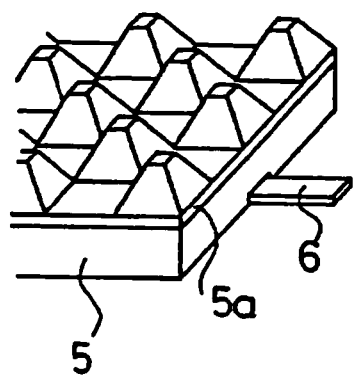
FIG. 6c is a perspective view for explaining another arrangement of the elastic fixing band according to the embodiment of the present invention.

Note that, with respect to a positional relation in a radial direction of the tire between the band-shaped sound absorbing material 5 and the elastic fixing band 6 in the case where the second porous material 5a is layered on a surface of the band-shaped sound absorbing material 5, the elastic fixing band 6 may be placed to the inner periphery or to the outer periphery of the band-shaped sound absorbing material 5 as shown in FIG. 6a or 6c, and furthermore, may be placed between the band-shaped sound absorbing material 5 and the second porous material 5a as shown in FIG. 6b.

The band-shaped sound absorbing material 5 and the elastic fixing band 6 according to the present invention are attached onto the tire T after it has gone through a vulcanization process, and for this reason, this invention does not necessitate alteration of production facilities and the like and is applicable to existing tires.

Note that, particularly by allowing the circumferential length of the elastic fixing band 6 to be variable and adjusting the circumferential length of the band-shaped sound absorbing material 5, it becomes possible to apply the common band-shaped sound absorbing material 5 and elastic fixing band 6 to various kinds of pneumatic tires. Furthermore, the band-shaped sound absorbing material 5 and the elastic fixing band 6 described above cannot be an obstacle against workability at the time of tire-rim assembly because they can be attached all around the entire circumference on the inner surface of the tread portion 1 of the tire T.

Particularly in order to allow the circumferential length of the elastic fixing band 6 to be variable and to make it possible to adjust the circumferential length of the band-shaped sound absorbing material 5 as described above, it is preferable to use an elastic fixing band provided with a stretching mechanism, which automatically adjusts the circumferential length of the elastic fixing band, in at least one location on a circumference of the elastic fixing band.

Figure 7:
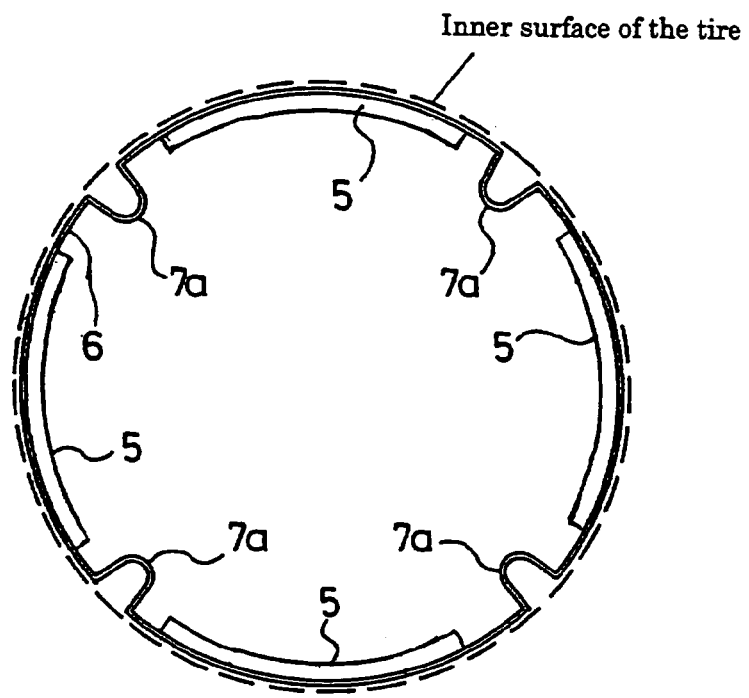
FIG. 7 is a side view showing a low noise pneumatic tire according to one example of the present invention, using an elastic fixing band provided, in at least one location on the circumference of the elastic fixing band, with the stretching mechanism which automatically adjusts a circumferential length of the elastic fixing band.
Figure 8:
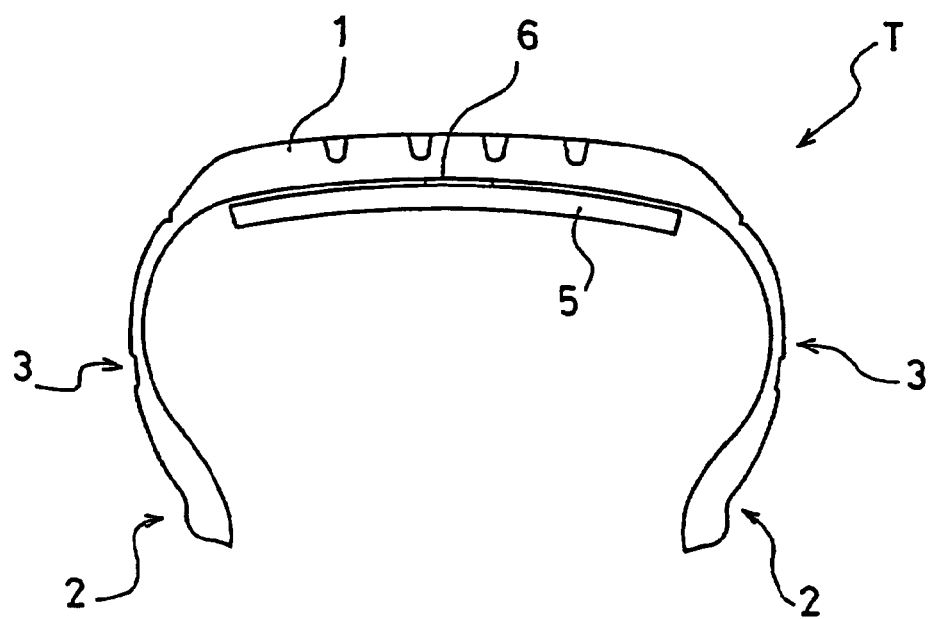
FIG. 8 is a cross-sectional view showing the tire in a state where it is fully inflated with a pneumatic pressure, taken along a meridian of the tire, for explaining the main portion of the example shown in FIG. 7 of the present invention.

In an illustration of an example of the above elastic fixing band shown in FIG. 7, the elastic fixing band 6 is preferably formed of a metal. The entirety of the elastic fixing band 6 is formed in a manner that the circumferential length thereof is cut off in at least one location (four locations in the illustration) on the circumference and both ends of a space thus cut off are coupled by a plate spring 7a which is bent in a U-shape. A portion corresponding to this U-shaped plate spring 7a is meant to work as a stretching mechanism which automatically absorbs a component in the circumferential direction of a load applied to the elastic fixing band 6. FIG. 8 is a cross-sectional view showing a state where a low noise pneumatic tire of the example shown in FIG. 7 is fully inflated with a pneumatic pressure, and the view is taken along a meridian of the tire. In the example shown in FIGS. 7 and 8, the elastic fixing band is arranged to the outer periphery of the band-shaped sound absorbing material 5 as shown in FIG. 2b.

Figure 9A:
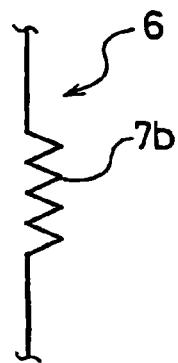
FIG. 9a is a schematic view showing one example of the stretching mechanism used in the elastic fixing band shown in FIG. 7 according to one aspect of the present invention.
Figure 9B:
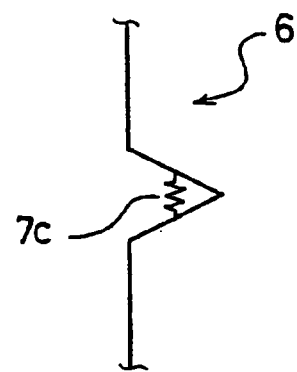
FIG. 9b is a schematic view showing another example of the stretching mechanism used in the elastic fixing band shown in FIG. 7 according to one aspect of the present invention.

As this kind of a stretching mechanism formed of the plate spring 7a, a plate spring 7b or 7c which is bent in a zig-zag manner as shown in FIG. 9a or 9b as an example may be used. Note that, although a number of the stretching mechanisms formed on the circumference of the elastic fixing band 6 is not particularly limited, it is better to arrange the stretching mechanisms evenly in three to eight locations on the circumference.

With respect to a width of the elastic fixing band 6, it is preferable to set the width in a range of 10 to 30 mm, and the width may be appropriately decided according to stiffness of the band-shaped sound absorbing material 5 within this range. If the width of the elastic fixing band 6 is less than 10 mm, strength of the elastic fixing band is insufficient. If the width of the elastic fixing band 6 exceeds 30 mm, it is not preferable because a weight of the elastic fixing band increases. With respect to a thickness of the elastic fixing band 6, it is preferable to set the thickness in a range of 0.5 to 2.0 mm. If the thickness of the elastic fixing band 6 is less than 0.5 mm, strength of the elastic fixing band is insufficient. If the thickness of the elastic fixing band 6 exceeds 2.0 mm, it is not preferable because the elastic fixing band becomes more breakable due to excessive flexural stiffness. It is more preferable to set the thickness of the elastic fixing band in a range of 0.75 to 1.5 mm.

In a tire where the elastic fixing band 6 is provided with the stretching mechanism 7a, 7b or 7c, even when an external force which may generate a buckling phenomenon or the like acts upon the elastic fixing band 6, the stretching mechanism automatically absorbs the external force. Consequently, a life of the elastic fixing band 6 can be prolonged, and additionally, attachment of the band-shaped sound absorbing material 5 to the inner surface of the tread can be stabilized.

Figure 10:
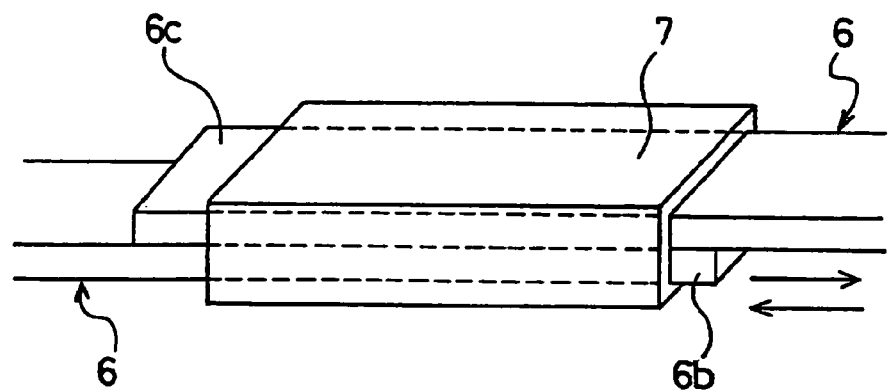
FIG. 10 is a schematic view showing still another example of the stretching mechanism used in the elastic fixing band shown in FIG. 7 according to one aspect of the present invention.

FIG. 10 shows still another example of the stretching mechanism. Both ends 6b, 6c of the elastic fixing band 6 in a lengthwise direction thereof are coupled with each other by use of a coupling jig in a manner that the elastic fixing band can slide. That is, while one end 6b of the elastic fixing band 6 is fixed to the coupling FIG. 7, the other end 6c thereof is allowed to freely slide to the directions indicated by arrows. For the purpose of securing a smooth slide of the end 6c, it is better to cover the end 6c of the elastic fixing band 6 and/or a sliding surface of the coupling FIG. 7 with fluorine type resin or to coat with lubricant.

Figure 11:
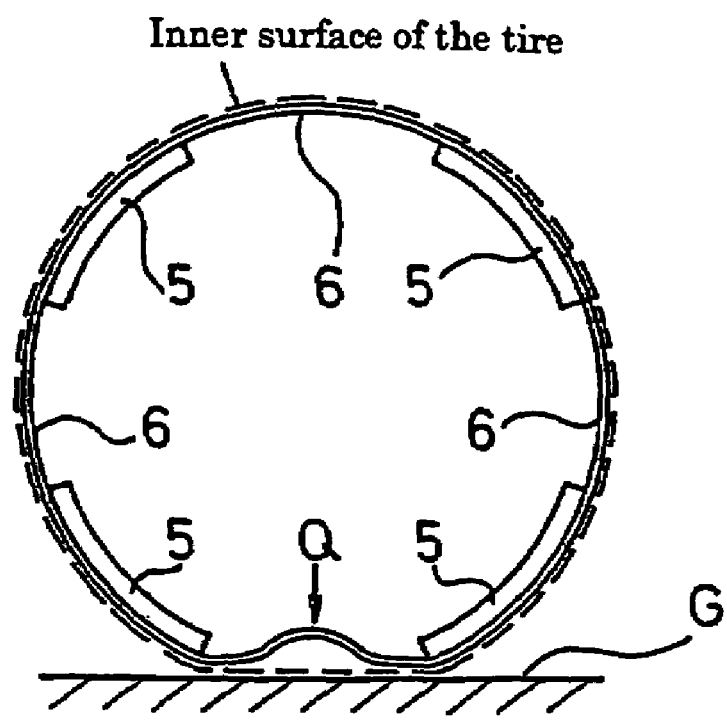
FIG. 11 is an illustration for explaining a buckling phenomenon of a tire.

By thus configuring a tire, the elastic fixing band 6 automatically absorbs the external force which may generate a buckling phenomenon or the like, whereby a fatigue life of the elastic fixing band 6 can be prolonged, and stable attachment of the band-shaped sound absorbing material 5 to the inner surface of the tread becomes possible. Incidentally, a situation shown in FIG. 11 indicates a situation where buckling occurs at a ground-contacting portion Q where the tire contact a ground surface G because the circumferential length of the elastic fixing band 6 incorporated in the tire is fixed constantly. This buckling has conventionally brought about such problems that attachment of the band-shaped sound absorbing material 5 becomes unstable, and that a fatigue life of the elastic fixing band 6 is shortened. However, in the present invention as described above, if a tire has an elastic fixing band provided with the stretching mechanism which automatically adjusts the circumferential length of the elastic fixing band, such problems can be reduced.

Note that, in the abovementioned example, the case shown as an example is such that the band-shaped sound absorbing material 5 is attached by pressure to the inner surface of the tread portion by the elastic fixing band 6 from the outer periphery of the band-shaped sound absorbing material 5. However, a positional relation in a radial direction of the tire between the elastic fixing band 6 and the band-shaped sound absorbing material 5 is not limited to this case, and the band-shaped sound absorbing material 5 may be attached by pressure to the inner surface of the tread portion by the elastic fixing band 6 from the inner periphery of the band-shaped sound absorbing material 5. Additionally, means for bonding the band-shaped sound absorbing material 5 with the elastic fixing band 6 may be determined by a kind and a shape of the band-shaped sound absorbing material 5, and is not particularly limited. However, it is possible to adopt bonding by a bond or by other coupling means.

EXAMPLES

Pneumatic tires with a tire size of 205/65R15 were prepared respectively as: a conventional tire (Conventional Example) where nothing was attached in a cavity portion thereof and a tire of the present invention (Example) and comparative tires (Comparative Examples 1 and 2) respectively having sound absorbing materials attached in cavity portions thereof all around entire circumferences on inner surfaces of tread portions thereof as shown in FIG. 2a, the sound absorbing materials having apparent densities defined in JIS K6400 made different as shown in Table 1. Note that a width and a thickness of the sound absorbing materials were commonly set to 150 mm and 40 mm, respectively.

Test tires of each of the Examples were mounted onto wheels of a rim size of 15×6½ JJ respectively, and an air pressure thereof was set at 220 kPa, and then were installed to a passenger automobile having a displacement of 2500 cc. Then, a microphone was installed at a position corresponding to an ear of a driver on a window side in a driver's seat inside a car cabin, and noise in a car cabin at frequencies of 200 to 250 Hz was measured when the automobile was run on a rough road surface with a speed of 50 km/h. Results of the measurement were averaged, and the obtained averages were converted into index numbers with the average of the conventional tire being set as 100, and are also shown in Table 1. A smaller value indicates that the noise is reduced.

TABLE 1

|  | Conventional Example | Example | Comparative Example 1 | Comparative Example 2 |
|---|---|---|---|---|
| Apparent density (kg/m³) | — | 30 | 5 | 80 |
| Noise inside car cabin at frequencies of 200 to 250 Hz | 100 | 92 | 100 | 99 |

From Table 1, it can be found that compared to the conventional tires, the tire of the present invention is reduced in cavity resonance noise at the frequencies of 200 to 250 Hz.

INDUSTRIAL APPLICABILITY

The low noise pneumatic tire of the present invention can be used in the tire industry, and by extension can be effectively utilized in the automobile industry as an instrument for realizing an automobile on which low noise pneumatic tires are mounted.

What is claimed is:

1. A low noise pneumatic tire, wherein a band-shaped sound absorbing material formed of a porous material whose apparent density defined in JIS K6400 is in a range of 10 to 70 kg/m3 is attached to the inner surface of a tread by use of an elastic fixing band,
    wherein the elastic fixing band is arranged in an annular form along an inner peripheral surface of the band-shaped sound absorbing material and is retained on the inner surface of the tread under pressure through the elastic force of the elastic fixing band.

2. The low noise pneumatic tire according to claim 1, wherein the band-shaped sound absorbing material is fixed all around the entire circumference on the inner surface of the tread by use of the elastic fixing band.

3. The low noise pneumatic tire according to claim 1, wherein an irregular surface having step heights of 20 mm or less is formed on the inner peripheral surface of the band-shaped sound absorbing material.

4. The low noise pneumatic tire according to claim 1, wherein a second porous material whose sound absorption coefficient defined in JIS A1405 at a frequency of 200 Hz is 10% or more, is layered on a cavity-facing surface of the band-shaped sound absorbing material.

5. The low noise pneumatic tire according to claim 4, wherein the band-shaped sound absorbing material has a thickness in a range of 5 to 45 mm, and the second porous material has a flat surface and has a thickness in a range of 5 to 45 mm.

6. The low noise pneumatic tire according to claim 4, wherein an irregularity having step heights of 20 mm or less is formed on a surface of the second porous material.

7. The low noise pneumatic tire according to claim 6, wherein the band-shaped sound absorbing material has a thickness in a range of 5 to 45 mm, and the second porous material has a thickness in a range of 5 to 45 mm.

8. The low noise pneumatic tire according to claim 1, wherein a porous material whose sound absorption coefficient defined in JIS A1405 at a frequency of 200 Hz is 10% or more, is layered on both inner and outer surfaces of the band-shaped sound absorbing material.

9. A low noise pneumatic tire, wherein a band-shaped sound absorbing material formed of a porous material whose apparent density defined in JIS K6400 is in a range of 10 to 70 kg/m3 is attached to the inner surface of a tread by use of an elastic fixing band,
    wherein the elastic fixing band has a stretching mechanism, which automatically adjusts a circumferential length of the elastic fixing band, in at least one location on the circumference of the elastic fixing band.

10. The low noise pneumatic tire according to claim 9, wherein the stretching mechanism is formed of an elastic spring mechanism.

11. The low noise pneumatic tire according to claim 9, wherein the stretching mechanism is formed by coupling both ends of the elastic fixing band with each other in a manner that the elastic fixing band can slide.

12. A low noise pneumatic tire, wherein a band-shaped sound absorbing material formed of a porous material whose apparent density defined in JIS K6400 is in a range of 10 to 70 kg/m3 is attached to the inner surface of a tread by use of an elastic fixing band,
    wherein the elastic fixing band is fixed by a bond along an outer peripheral surface of the band-shaped sound absorbing material and is retained on the inner surface of the tread under pressure through the elastic force of the elastic fixing band.

13. The low noise pneumatic tire according to claim 12, wherein the band-shaped sound absorbing material is fixed all around the entire circumference on the inner surface of the tread by use of the elastic fixing band.

14. The low noise pneumatic tire according to claim 12, wherein an irregular surface having step heights of 20 mm or less is formed on the inner peripheral surface of the band-shaped sound absorbing material.

15. The low noise pneumatic tire according to claim 12, wherein a second porous material whose sound absorption coefficient defined in JIS A1405 at a frequency of 200 Hz is 10% or more, is layered on a cavity-facing surface of the band-shaped sound absorbing material.

16. The low noise pneumatic tire according to claim 15, wherein the band-shaped sound absorbing material has a thickness in a range of 5 to 45 mm, and the second porous material has a flat surface and has a thickness in a range of 5 to 45 mm.

17. The low noise pneumatic tire according to claim 15, wherein an irregularity having step heights of 20 mm or less is formed on a surface of the second porous material.

18. The low noise pneumatic tire according to claim 17, wherein the band-shaped sound absorbing material has a thickness in a range of 5 to 45 mm, and the second porous material has a thickness in a range of 5 to 45 mm.

19. The low noise pneumatic tire according to claim 12, wherein a porous material whose sound absorption coefficient defined in JIS A1405 at a frequency of 200 Hz is 10% or more, is layered on both inner and outer surfaces of the band-shaped sound absorbing material.

* * * * *